(12) United States Patent
Lakshmanamurthy et al.

(10) Patent No.: US 9,448,870 B2
(45) Date of Patent: Sep. 20, 2016

(54) PROVIDING ERROR HANDLING SUPPORT TO LEGACY DEVICES

(71) Applicant: Intel Corporation, Santa Clara, CA (US)

(72) Inventors: Sridhar Lakshmanamurthy, Sunnyvale, CA (US); Mikal C. Hunsaker, El Dorado Hills, CA (US); Michael T. Klinglesmith, Portland, OR (US); Blaise Fanning, Folsom, CA (US); Rohit R. Verma, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/503,637

(22) Filed: Oct. 1, 2014

(65) Prior Publication Data

US 2015/0067412 A1 Mar. 5, 2015

Related U.S. Application Data

(63) Continuation of application No. 13/248,252, filed on Sep. 29, 2011, now Pat. No. 8,874,976.

(51) Int. Cl.
*G06F 11/00* (2006.01)
*G06F 11/07* (2006.01)
*G06F 13/42* (2006.01)

(52) U.S. Cl.
CPC ....... *G06F 11/0772* (2013.01); *G06F 11/0784* (2013.01); *G06F 11/0793* (2013.01); *G06F 13/4221* (2013.01)

(58) Field of Classification Search
CPC .......... G06F 11/0772; G06F 11/0784; G06F 11/0793; G06F 13/4221
USPC ...................................... 714/48–49
See application file for complete search history.

(56) References Cited

U.S. PATENT DOCUMENTS 5,493,566 A 2/1996 Ljungberg et al.
6,009,488 A 12/1999 Kavipurapu (Continued)

FOREIGN PATENT DOCUMENTS

CN 1819555 8/2006
CN 1833415 9/2006

(Continued)

OTHER PUBLICATIONS

U.S. Patent and Trademark Office, Office Action mailed Dec. 3, 2013, with Reply filed Feb. 26, 2014, in U.S. Appl. No. 13/248,234.

(Continued)

*Primary Examiner* — Yair Leibovich
(74) *Attorney, Agent, or Firm* — Trop, Pruner & Hu, P.C.

(57) ABSTRACT

In one embodiment, the present invention includes a method for handling a request received in an agent designed in accordance with a peripheral component interconnect (PCI) specification using PCI Express™ semantics. More specifically, responsive to determining that the agent does not support the request, an unsupported request detection register of the agent can be updated, and a response sent from the agent to indicate that the agent does not support the request. Other embodiments are described and claimed.

23 Claims, 8 Drawing Sheets

(56) References Cited

U.S. PATENT DOCUMENTS

| | | |
|---|---|---|
| 6,233,632 B1 | 5/2001 | Meiyappan et al. |
| 6,330,647 B1 | 12/2001 | Jeddeloh et al. |
| 6,427,169 B1 | 7/2002 | Elzur |
| 6,430,182 B1 | 8/2002 | Oyama |
| 6,469,982 B1 | 10/2002 | Henrion et al. |
| 6,611,893 B1 | 8/2003 | Lee et al. |
| 6,694,380 B1 | 2/2004 | Wolrich et al. |
| 6,725,313 B1 | 4/2004 | Wingard et al. |
| 6,810,460 B1 | 10/2004 | Kirkwood |
| 6,816,938 B2 | 11/2004 | Edara et al. |
| 7,065,733 B2 | 6/2006 | Goodnow et al. |
| 7,415,533 B1 | 8/2008 | Lacroute et al. |
| 7,421,543 B2 | 9/2008 | Suzuki |
| 7,457,905 B2 | 11/2008 | Gehman |
| 7,506,089 B2 | 3/2009 | Cho et al. |
| 7,573,295 B1 | 8/2009 | Stadler |
| 7,673,087 B1 | 3/2010 | Ansari et al. |
| 7,685,346 B2 | 3/2010 | Teh |
| 7,725,757 B2 | 5/2010 | Mandhani et al. |
| 7,734,856 B2 | 6/2010 | Reinig |
| 7,783,819 B2 | 8/2010 | Mandhani |
| 7,793,345 B2 | 9/2010 | Weber et al. |
| 7,873,068 B2 | 1/2011 | Klinglesmith et al. |
| 7,979,592 B1 | 7/2011 | Pettey et al. |
| 7,990,999 B2 | 8/2011 | Lee |
| 8,010,731 B2 | 8/2011 | Mandhani |
| 8,023,508 B2 | 9/2011 | Horton |
| 8,069,286 B1 | 11/2011 | Orthner et al. |
| 8,199,157 B2 | 6/2012 | Park et al. |
| 8,225,019 B2 | 7/2012 | Asnaashari |
| 8,286,014 B2 | 10/2012 | Han et al. |
| 8,364,874 B1 | 1/2013 | Schlansker et al. |
| 8,437,369 B2 | 5/2013 | Shaikli |
| 8,443,422 B2 | 5/2013 | Weber et al. |
| 2002/0038401 A1 | 3/2002 | Zaidi |
| 2003/0088722 A1 | 5/2003 | Price |
| 2003/0126336 A1 | 7/2003 | Creta |
| 2003/0227926 A1 | 12/2003 | Ramamurthy et al. |
| 2004/0177176 A1 | 9/2004 | Li et al. |
| 2004/0218600 A1 | 11/2004 | Alasti et al. |
| 2005/0010687 A1 | 1/2005 | Dai |
| 2005/0120323 A1 | 6/2005 | Goodnow et al. |
| 2005/0137966 A1 | 6/2005 | Munguia et al. |
| 2005/0177664 A1 | 8/2005 | Cho et al. |
| 2005/0289369 A1 | 12/2005 | Chung et al. |
| 2005/0289374 A1 | 12/2005 | Kim et al. |
| 2006/0047849 A1 | 3/2006 | Mukherjee |
| 2006/0101179 A1 | 5/2006 | Lee et al. |
| 2006/0140126 A1 | 6/2006 | Zhong |
| 2006/0218336 A1 | 9/2006 | Ishizawa et al. |
| 2007/0006108 A1 | 1/2007 | Bueti |
| 2007/0067549 A1 | 3/2007 | Gehman |
| 2007/0112984 A1* | 5/2007 | Ohara ........................... 710/107 |
| 2008/0059441 A1 | 3/2008 | Gaug et al. |
| 2008/0082840 A1 | 4/2008 | Kendall et al. |
| 2008/0147858 A1 | 6/2008 | Prakash et al. |
| 2008/0163005 A1 | 7/2008 | Sonksen et al. |
| 2008/0235415 A1 | 9/2008 | Clark et al. |
| 2008/0288689 A1 | 11/2008 | Hoang et al. |
| 2008/0310458 A1 | 12/2008 | Rijpkema |
| 2009/0006165 A1 | 1/2009 | Teh et al. |
| 2009/0119432 A1 | 5/2009 | Lee et al. |
| 2009/0235099 A1 | 9/2009 | Branover et al. |
| 2009/0248940 A1 | 10/2009 | Marino et al. |
| 2009/0249098 A1 | 10/2009 | Han et al. |
| 2009/0296624 A1 | 12/2009 | Ryu et al. |
| 2009/0296740 A1 | 12/2009 | Wagh |
| 2009/0300245 A1 | 12/2009 | Shoemaker et al. |
| 2009/0310616 A1 | 12/2009 | Cummings et al. |
| 2010/0199010 A1 | 8/2010 | Goren et al. |
| 2010/0220703 A1 | 9/2010 | Farrugia et al. |
| 2010/0235675 A1 | 9/2010 | Subramanian et al. |
| 2010/0246594 A1* | 9/2010 | Klinglesmith ...... H04L 12/6418 370/419 |
| 2010/0262855 A1 | 10/2010 | Buch et al. |
| 2010/0278195 A1 | 11/2010 | Wagh |
| 2010/0293304 A1 | 11/2010 | Alexandron et al. |
| 2010/0312942 A1 | 12/2010 | Blinick et al. |
| 2011/0032947 A1 | 2/2011 | Brueggen |
| 2011/0047272 A1 | 2/2011 | Bosneag |
| 2011/0078315 A1 | 3/2011 | Matsushita et al. |
| 2011/0078356 A1 | 3/2011 | Shoemaker |
| 2011/0093576 A1 | 4/2011 | Cherian et al. |
| 2011/0179248 A1 | 7/2011 | Lee |
| 2011/0238728 A1 | 9/2011 | Nagarajrao et al. |
| 2012/0051297 A1 | 3/2012 | Lee et al. |
| 2012/0066468 A1 | 3/2012 | Nakajima et al. |
| 2012/0079590 A1 | 3/2012 | Sastry et al. |
| 2012/0233514 A1 | 9/2012 | Patil et al. |
| 2012/0303842 A1 | 11/2012 | Cardinell et al. |
| 2012/0303899 A1 | 11/2012 | Ash et al. |
| 2012/0311213 A1 | 12/2012 | Bender et al. |
| 2013/0054845 A1 | 2/2013 | Nimmala et al. |
| 2013/0086433 A1* | 4/2013 | Lakshmanamurthy G06F 11/0793 714/48 |
| 2013/0086586 A1* | 4/2013 | Lakshmanamurthy G06F 15/7864 718/100 |
| 2013/0089095 A1 | 4/2013 | Chen et al. |
| 2013/0138858 A1* | 5/2013 | Adler .................... G06F 13/366 710/305 |
| 2016/0062424 A1* | 3/2016 | Thomas .................... G06F 1/24 710/313 |

FOREIGN PATENT DOCUMENTS

| | | |
|---|---|---|
| CN | 101267376 | 9/2008 |
| CN | 101558589 | 10/2009 |
| CN | 101873339 | 10/2010 |
| EP | 1328104 | 7/2003 |
| EP | 2216722 A2 | 8/2010 |
| JP | 2007-135035 | 5/2007 |
| KR | 10-2005-0077437 | 8/2005 |
| KR | 10-2005-0082834 | 8/2005 |
| WO | 2005071553 | 8/2005 |
| WO | 2010102055 | 9/2010 |
| WO | 2010137572 | 12/2010 |

OTHER PUBLICATIONS

U.S. Patent and Trademark Office, Final Office Action mailed Jun. 13, 2014, with Reply to Final filed Aug. 7, 2014 in U.S. Appl. No. 13/248,234.

U.S. Patent and Trademark Office, Office Action mailed Apr. 23, 2014, with Reply filed Jul. 22, 2014, in U.S. Appl. No. 13/222,362.

U.S. Patent and Trademark Office, Office Action mailed Mar. 31, 2014, with Reply filed Jun. 26, 2014, in U.S. Appl. No. 13/222,354.

U.S. Patent and Trademark Office, Final Office Action mailed Jul. 7, 2014, with Reply filed Aug. 22, 2014 in U.S. Appl. No. 13/222,354.

U.S. Patent and Trademark Office, Office Action mailed Oct. 23, 2013, with Reply filed Jan. 22, 2014, in U.S. Appl. No. 13/306,244.

U.S. Patent and Trademark Office, Final Office Action mailed Apr. 30, 2014, with PreAppeal Request and Notice of Appeal filed Jul. 23, 2014 in U.S. Appl. No. 13/306,244.

PCI-SIG, "PCI Local Bus Specification, Revision 3.0," Feb. 3, 2004, 3 pages.

U.S. Appl. No. 14/326,654, filed Jul. 9, 2014, entitled "Common Idle State, Active State and Credit Management for an Interface", by Sridhar Lakshmanamurthy, et al.

U.S. Appl. No. 14/209,207, filed Mar. 13, 2014, entitled "Aggregating Completion Messages in a Sideband Interface", by Sridhar Lakshmanamurthy, et al.

U.S. Appl. No. 14/209,184, filed Mar. 13, 2014, entitled "Providing Multiple Decode Options for a System-on-Chip (SoC) Fabric", by Sridhar Lakshmanamurthy, et al.

U.S. Appl. No. 14/209,146, filed Mar. 13, 2014, entitled "Supporting Multiple Channels of a Single Interface", by Sridhar Lakshmanamurthy, et al.

(56) References Cited

OTHER PUBLICATIONS

U.S. Appl. No. 14/295,810, filed Jun. 4, 2014, entitled "Issuing Requests to a Fabric", by Sridhar Lakshmanamurthy, et al.
U.S. Patent and Trademark Office, Office Action mailed Jul. 22, 2014, in U.S. Appl. No. 14/295,810.
U.S. Patent and Trademark Office, Office Action mailed Jun. 7, 2013 with Reply filed Sep. 3, 2013, in U.S. Appl. No. 13/248,232.
U.S. Patent and Trademark Office, Office Action mailed Jun. 20, 2013 with Reply filed Sep. 18, 2013, in U.S. Appl. No. 13/248,243.
U.S. Patent and Trademark Office, Office Action mailed Apr. 23, 2013 with Reply filed Jul. 22, 2013, in U.S. Appl. No. 13/248,263.
U.S. Patent and Trademark Office, Office Action mailed Jun. 14, 2013 with Reply filed Sep. 9, 2013, in U.S. Appl. No. 13/248,270.
U.S. Patent and Trademark Office, Office Action mailed Jun. 20, 2013 with Reply filed Sep. 17, 2013, in U.S. Appl. No. 13/248,276.
U.S. Appl. No. 13/248,234, filed Sep. 29, 2011, entitled, "Sending Packets With Expanded Headers", by Sridhar Lakshmanamurthy, et al.
U.S. Appl. No. 13/248,232, filed Sep. 29, 2011, entitled, "Common Idle State, Active State and Credit Management for an Interface", by Sridhar Lakshmanamurthy, et al.
U.S. Appl. No. 13/248,243, filed Sep. 29, 2011, entitled, "Aggregating Completion Messages in a Sideband Interface", by Sridhar Lakshmanamurthy, et al.
U.S. Appl. No. 13/248,263, filed Sep. 29, 2011, entitled, "Providing Multiple Decode Options for a System-on-Chip (SoC) Fabric", by Sridhar Lakshmanamurthy, et al.
U.S. Appl. No. 13/248,270, filed Sep. 29, 2011, entitled, "Supporting Multiple Channels of a Single Interface", by Sridhar Lakshmanamurthy, et al.
U.S. Appl. No. 13/248,276, filed Sep. 29, 2011, entitled, "Issuing Requests to a Fabric", by Sridhar Lakshmanamurthy, et al.
U.S. Appl. No. 13/222,362, filed Aug. 31, 2011, entitled, "Integrating Intellectual Property (IP) Blocks Into a Processor", by Prashanth Nimmala, et al.
U.S. Appl. No. 13/306,244, filed Nov. 29, 2011, entitled, "Providing a Sideband Message Interface for System on a Chip (SoC)", by Robert P. Adler, et al.
U.S. Appl. No. 13/222,354, filed Aug. 31, 2011, entitled, "Providing Adaptive Bandwidth Allocation for a Fixed Priority Arbiter", by Kie Woon Lim, et al.
Intel Corporation, "An Introduction to the Intel QuickPath Interconnect," Jan. 2009, pp. 1-22.
Sousek, et al., "PCI Express Core Integration with the OCP Bus," CAST, Inc., 2006, 15 pages.
Mentor Graphics, "PCI Express to AMBA 3 AXI Bridge IP," Mentor Graphics, Jun. 2007, 2 pages.
Everton Carara, et al., "Communication Models in Networks-on-Chip," 18th IEEE/IFIP International Workshop on Rapid System Prototyping (RSP '07), 2007, pp. 57-60.
PCI-SIG, "PCI Local Bus Specification Revision 3.0," pp. 36 and 214, Feb. 3, 2004.
Japan Patent Office, Office Action mailed Nov. 24, 2015 in Japanese Patent Application No. 2015-002299.
European Patent Office, Extended European Search Report mailed Oct. 9, 2015 in European Patent Application No. 15177163.1.
China Patent Office, Office Action mailed Nov. 3, 2015 in Chinese Patent Application No. 201280047815.4.
China Patent Office, Office Action mailed Dec. 3, 2015 in Chinese Patent Application No. 201280058462.8.

\* cited by examiner

PROVIDING ERROR HANDLING SUPPORT TO LEGACY DEVICES

This application is a continuation of U.S. patent application Ser. No. 13/248,252, filed Sep. 29, 2011, the content of which is hereby incorporated by reference.

BACKGROUND

Mainstream processor chips, both in high performance and low power segments, are increasingly integrating additional functionality such as graphics, display engines, security engines, PCIe™ ports (i.e., ports in accordance with the Peripheral Component Interconnect Express (PCI Express™ (PCIe™)) Specification Base Specification version 2.0 (published 2007) (hereafter the PCIe™ specification) and other PCIe™ based peripheral devices, while maintaining legacy support for devices compliant with a PCI specification such as the Peripheral Component Interconnect (PCI) Local Bus Specification, version 3.0 (published 2002) (hereafter the PCI specification).

Such designs are highly segmented due to varying requirements from the server, desktop, mobile, embedded, ultra-mobile and mobile Internet device segments. Different markets seek to use single chip system-on-chip (SoC) solutions that combine at least some of processor cores, memory controllers, input/output controllers and other segment specific acceleration elements onto a single chip. However, designs that accumulate these features are slow to emerge due to the difficulty of integrating different intellectual property (IP) blocks on a single die. This is especially so, as IP blocks can have various requirements and design uniqueness, and can require many specialized wires, communication protocols and so forth to enable their incorporation into an SoC. As a result, each SoC or other advanced semiconductor device that is developed requires a great amount of design complexity and customization to incorporate different IP blocks into a single device. This is so, as a given IP block typically needs to be re-designed to accommodate interface and signaling requirements of a given SoC.

Thus a system can include a mix of PCI and PCIe™ devices. At the time of its creation, the original PCI specification did not contain concepts and semantics that were later introduced in the PCIe™ specification. One of these semantics introduced by the PCIe™ specification is an Unsupported Request (UR) completion response. This response provides an indication from a PCIe™ device to an upstream component that it cannot handle a particular request and thus it responds with the UR completion response. In contrast, the PCI specification did not provide such a response. Instead, according to the PCI specification, when a device is unable to handle a request, it de-asserts a device select signal (DEVSEL#) to indicate to the upstream device that it cannot handle the request. As a result, the transaction master aborts and the PCI device is not involved in logging and reporting of Unsupported Requests.

DETAILED DESCRIPTION

Embodiments may provide a set of rules for devices (e.g., so-called intellectual property (IP) agents) that are designed according to requirements of a PCI specification and thus are considered as a PCI device, rather than being designed according to requirements of a PCIe™ specification (and thus considered as a PCIe™ device). That is, embodiments of a system such as a system-on-chip (SoC) designed according to an integrated on-chip system fabric (IOSF) specification can provide logic to be incorporated into a PCI IP agent such that it can appropriately respond to certain transactions according to a PCIe™-specific response. As a representative example, described herein is an ability to provide logic to a PCI IP agent to enable the agent to respond with PCIe™-specific error responses to certain transactions that it cannot handle, e.g., an Unsupported Request completion response. In this way, these rules and flows add additional robustness to PCI devices.

Embodiments can be used in many different types of systems. As examples, implementations described herein may be used in connection with semiconductor devices such as processors or other semiconductor devices that can be fabricated on a single semiconductor die. In particular implementations, the device may be a system-on-chip (SoC) or other advanced processor or chipset that includes various homogeneous and/or heterogeneous processing agents, and additional components such as networking components, e.g., routers, controllers, bridge devices, devices, memories and so forth.

Some implementations may be used in a semiconductor device that is designed according to a given specification such as an integrated on-chip system fabric (IOSF) specification issued by a semiconductor manufacturer to provide a standardized on-die interconnect protocol for attaching intellectual property (IP) blocks within a chip, including a SoC. Such IP blocks can be of varying types, including general-purpose processors such as in-order or out-of-order cores, fixed function units, graphics processors, IO controllers, display controllers, media processors among many others. By standardizing an interconnect protocol, a framework is thus realized for a broad use of IP agents in different types of chips. Accordingly, not only can the semiconductor manufacturer efficiently design different types of chips across a wide variety of customer segments, it can also, via the specification, enable third parties to design logic such as IP agents to be incorporated in such chips. And furthermore, by providing multiple options for many facets of the interconnect protocol, reuse of designs is efficiently accommodated. Although embodiments are described herein in connection with this IOSF specification, understand the scope of the present invention is not limited in this regard and embodiments can be used in many different types of systems.

Figure 1:
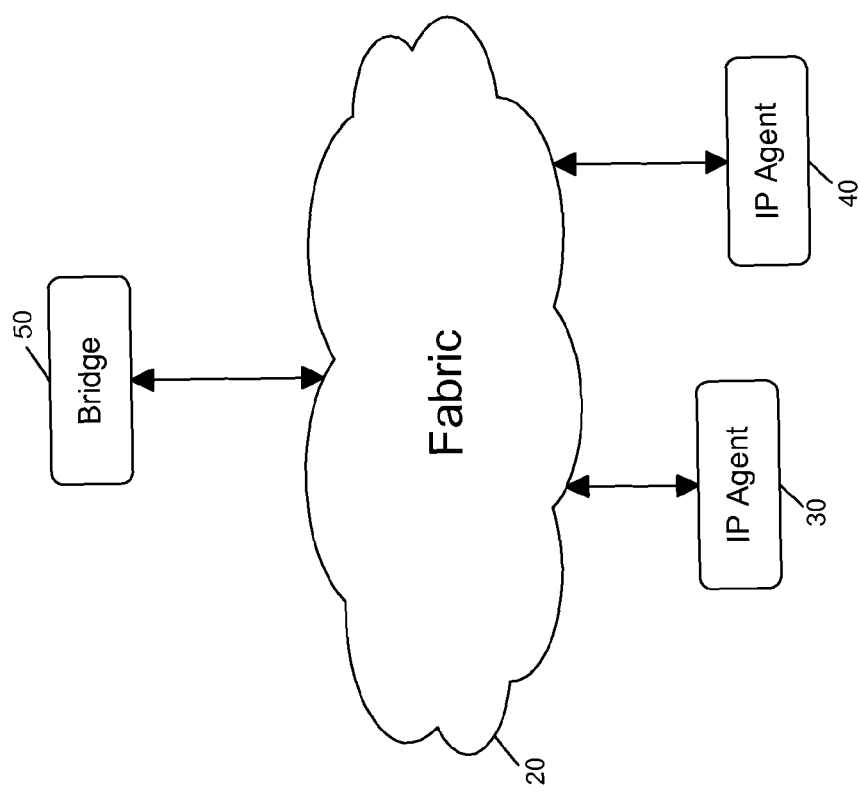
FIG. 1 is a block diagram of a basic interconnect architecture in accordance with an embodiment of the present invention.

Referring now to FIG. 1, shown is a block diagram of a basic interconnect architecture in accordance with an embodiment of the present invention. As shown in FIG. 1, system 10 may be a portion of a system-on-chip or any other semiconductor device such as a highly integrated processor complex or an integrated IO hub, and includes a fabric 20 that acts as an interconnect between various components. In the implementation shown, these components include IP agents 30 and 40, which can be independent IP blocks to provide various functionality such as compute capabilities, graphics capabilities, media processing capabilities and so forth. These IP agents are thus IP blocks or logical devices having an interface that is compliant with the IOSF specification, in one embodiment. As further seen, fabric 20 also interfaces to a bridge 50. Although not shown for ease of illustration in the embodiment of FIG. 1, understand that bridge 50 may act as an interface to other system components, e.g., on the same chip or on one or more different chips.

As will be described further below, each of the elements shown in FIG. 1, namely the fabric, the IP agents, and the bridge may include one or more interfaces to handle communication of various signals. These interfaces may be defined according to the IOSF specification, which defines signals for communication on these interfaces, protocols used for information exchange between agents, arbitration and flow control mechanisms used to initiate and manage information exchange, supported address decoding and translation capabilities, messaging for in-band or out-of-band communication, power management, test, validation and debug support.

The IOSF specification includes 3 independent interfaces that can be provided for each agent, namely a primary interface, a sideband message interface and a testability and debug interface (design for test (DFT), design for debug (DFD) interface). According to the IOSF specification, an agent may support any combination of these interfaces. Specifically, an agent can support 0-N primary interfaces, 0-N sideband message interfaces, and optional DFx interfaces. However, according to the specification, an agent must support at least one of these 3 interfaces.

Figure 2:
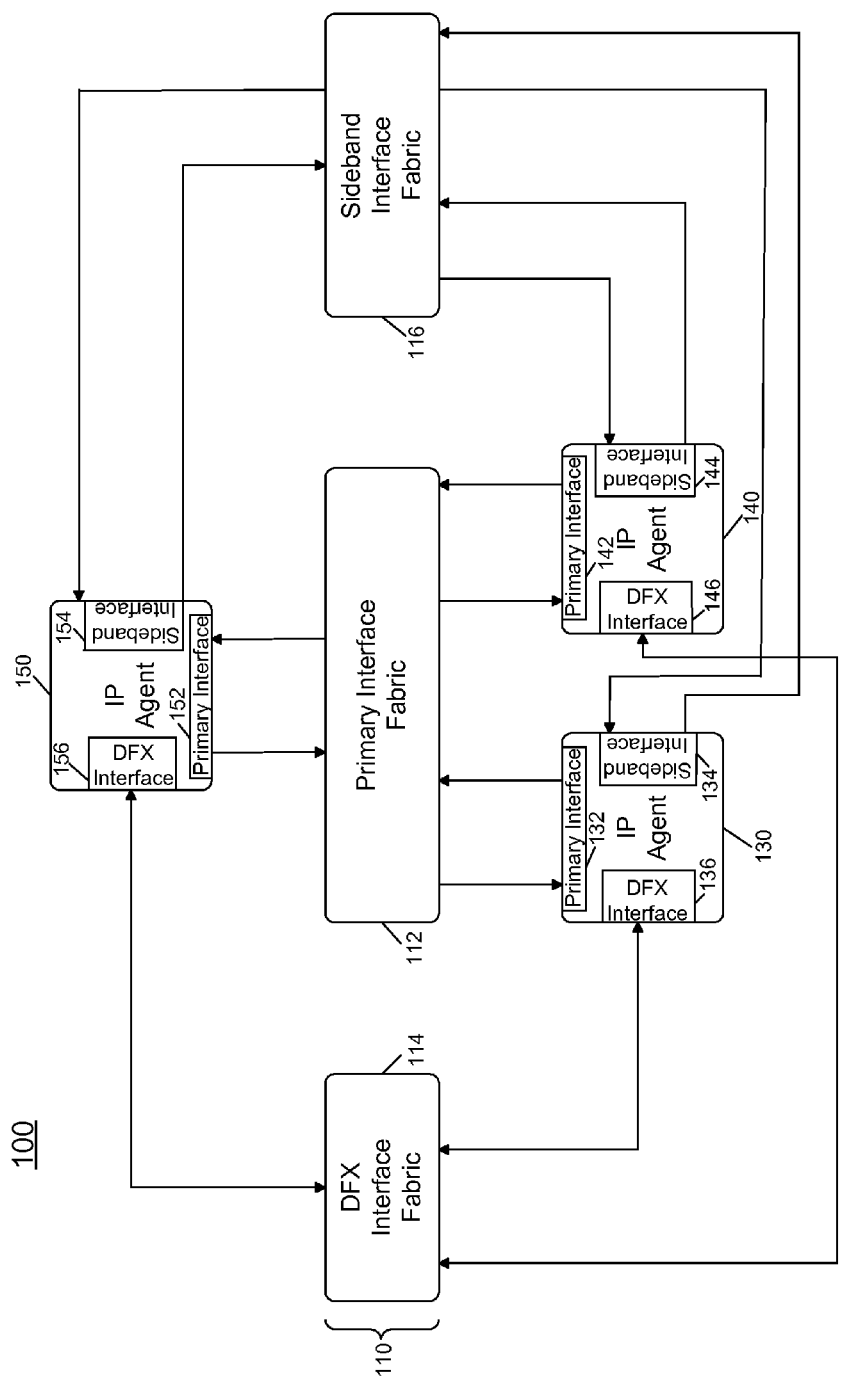
FIG. 2 is a block diagram of further details of an interconnect architecture in accordance with an embodiment of the present invention.

Fabric 20 may be a hardware element that moves data between different agents. Note that the topology of fabric 20 will be product specific. As examples, a fabric can be implemented as a bus, a hierarchical bus, a cascaded hub or so forth. Referring now to FIG. 2, shown is a block diagram of further details of an interconnect architecture in accordance with an embodiment of the present invention. As shown in FIG. 2, the IOSF specification defines three distinct fabrics, namely a primary interface fabric 112, a DFx fabric 114, and a sideband fabric 116. Primary interface fabric 112 is used for all in-band communication between agents and memory, e.g., between a host processor such as a central processing unit (CPU) or other processor and an agent. Primary interface fabric 112 may further enable communication of peer transactions between agents and supported fabrics. All transaction types including memory, input output (IO), configuration, and in-band messaging can be delivered via primary interface fabric 112. Thus the primary interface fabric may act as a high performance interface for data transferred between peers and/or communications with upstream components.

In various implementations, primary interface fabric 112 implements a split transaction protocol to achieve maximum concurrency. That is, this protocol provides for a request phase, a grant phase, and a command and data phase. Primary interface fabric 112 supports three basic request types: posted, non-posted, and completions, in various embodiments. Generally, a posted transaction is a transaction which when sent by a source is considered complete by the source and the source does not receive a completion or other confirmation message regarding the transaction. One such example of a posted transaction may be a write transaction. In contrast, a non-posted transaction is not considered completed by the source until a return message is received, namely a completion. One example of a non-posted transaction is a read transaction in which the source agent requests a read of data. Accordingly, the completion message provides the requested data.

In addition, primary interface fabric 112 supports the concept of distinct channels to provide a mechanism for independent data flows throughout the system. As will be described further, primary interface fabric 112 may itself include a master interface that initiates transactions and a target interface that receives transactions. The primary master interface can further be sub-divided into a request interface, a command interface, and a data interface. The request interface can be used to provide control for movement of a transaction's command and data. In various embodiments, primary interface fabric 112 may support PCI ordering rules and enumeration.

In turn, sideband interface fabric 116 may be a standard mechanism for communicating all out-of-band information. In this way, special-purpose wires designed for a given implementation can be avoided, enhancing the ability of IP reuse across a wide variety of chips. Thus in contrast to an IP block that uses dedicated wires to handle out-of-band communications such as status, interrupt, power management, fuse distribution, configuration shadowing, test modes and so forth, a sideband interface fabric 116 according to the IOSF specification standardizes all out-of-band communication, promoting modularity and reducing validation requirements for IP reuse across different designs. In general, sideband interface fabric 116 may be used to communicate non-performance critical information, rather than for performance critical data transfers, which typically may be communicated via primary interface fabric 112.

As further illustrated in FIG. 2, IP agents 130, 140, and 150 may each include a corresponding primary interface, a sideband interface and a DFx interface. However, as discussed above, each agent need not include every one of these interfaces, and a given IP agent may include only a single interface, in some embodiments.

Figure 3:
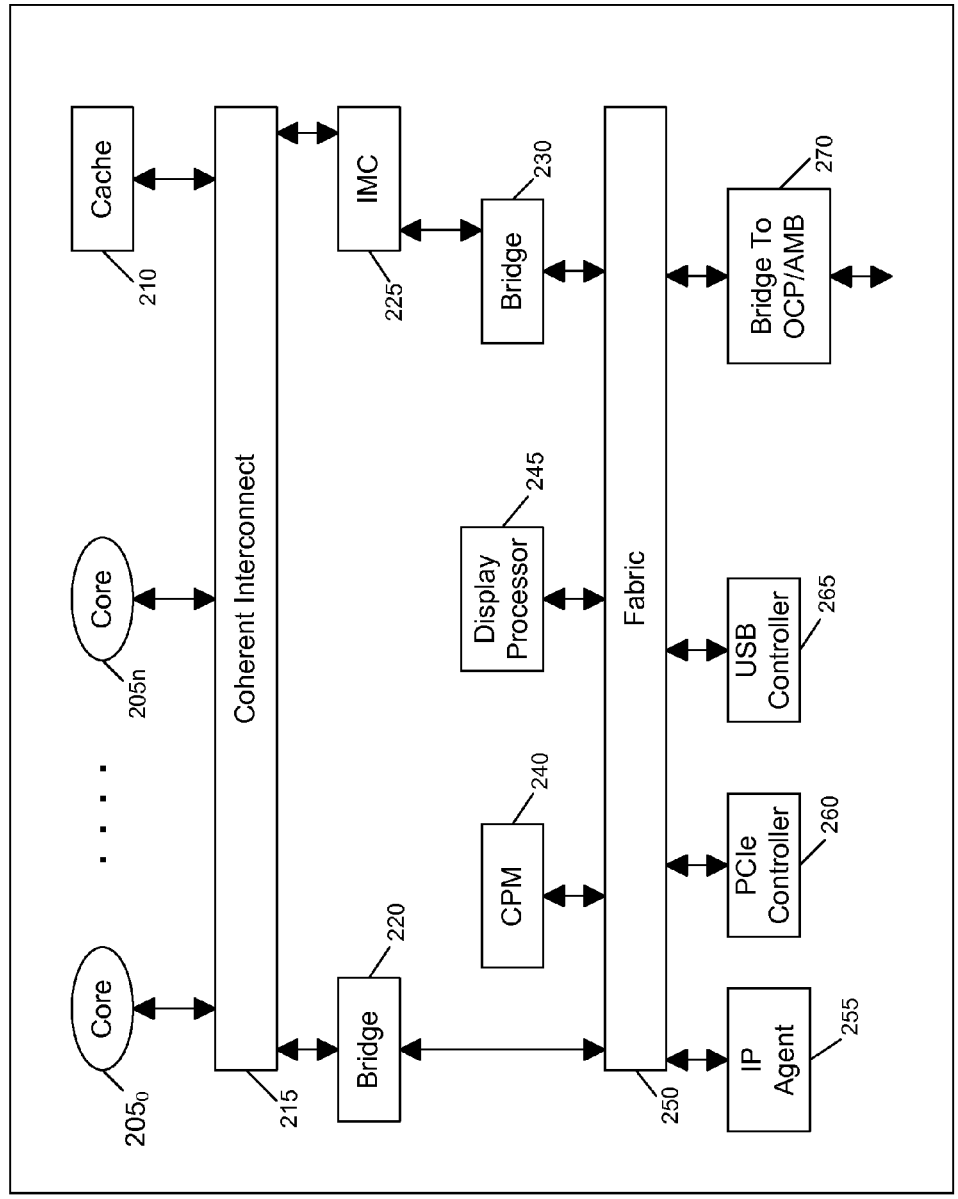
FIG. 3 is a high level block diagram of a SoC in accordance with an embodiment of the present invention.

Using an IOSF specification, various types of chips can be designed having a wide variety of different functionality. Referring now to FIG. 3, shown is a high level block diagram of a SoC in accordance with an embodiment of the present invention. As shown in FIG. 3, SoC 200 may include various components, all of which can be integrated on a single semiconductor die to provide for various processing capabilities at high speeds and low power, consuming a comparatively small amount of real estate. As seen in FIG. 3, SoC 200 includes a plurality of cores $205_0$-$205_n$. In various embodiments, cores 205 can be relatively simple in-order cores or more complex out-of-order cores. Or a combination of in-order and out-of-order cores can be present in a single SoC. As seen, cores 205 can be interconnected via a coherent interconnect 215, which further couples to a cache memory 210, e.g., a shared last level cache (LLC). Although the scope of the present invention is not limited in this regard, in one embodiment coherent interconnect 215 may be in accordance with the Quick Path Interconnect (QPI)™ specification available from Intel Corporation, Santa Clara, Calif.

As further seen in FIG. 3, coherent interconnect 215 may communicate via a bridge 220 to a fabric 250, which may be an IOSF fabric. Coherent interconnect 215 may further communicate via an integrated memory controller 215 to an off-chip memory (not shown for ease of illustration the embodiment of FIG. 3), and further through bridge 230 to fabric 250.

As further seen in FIG. 3, various components can couple to fabric 250 including a content processing module (CPM) 240 which can be used for performing various operations such as security processing, cryptographic functions and so forth. In addition, a display processor 245 can be part of a media processing pipeline that renders video for an associated display.

As further seen, fabric 250 may further couple to an IP agent 255. Although only a single agent is shown for ease of illustration in the FIG. 3 embodiment, understand that multiple such agents are possible in different embodiments. In addition, to enable communication with other on-chip devices, fabric 250 may further communicate with a PCIe™ controller 260 and a universal serial bus (USB) controller 265, both of which can communicate with various devices according to these protocols. Finally, shown in the embodiment of FIG. 3 is a bridge 270, which can be used to communicate with additional components of other protocols, such as an open core protocol (OCP) or an ARM advanced microcontroller bus architecture (AMBA) protocol. Although shown with these particular components in the embodiment of FIG. 3, understand that the scope of the present invention is not limited in this way and in different embodiments additional or different components may be present.

Figure 4:
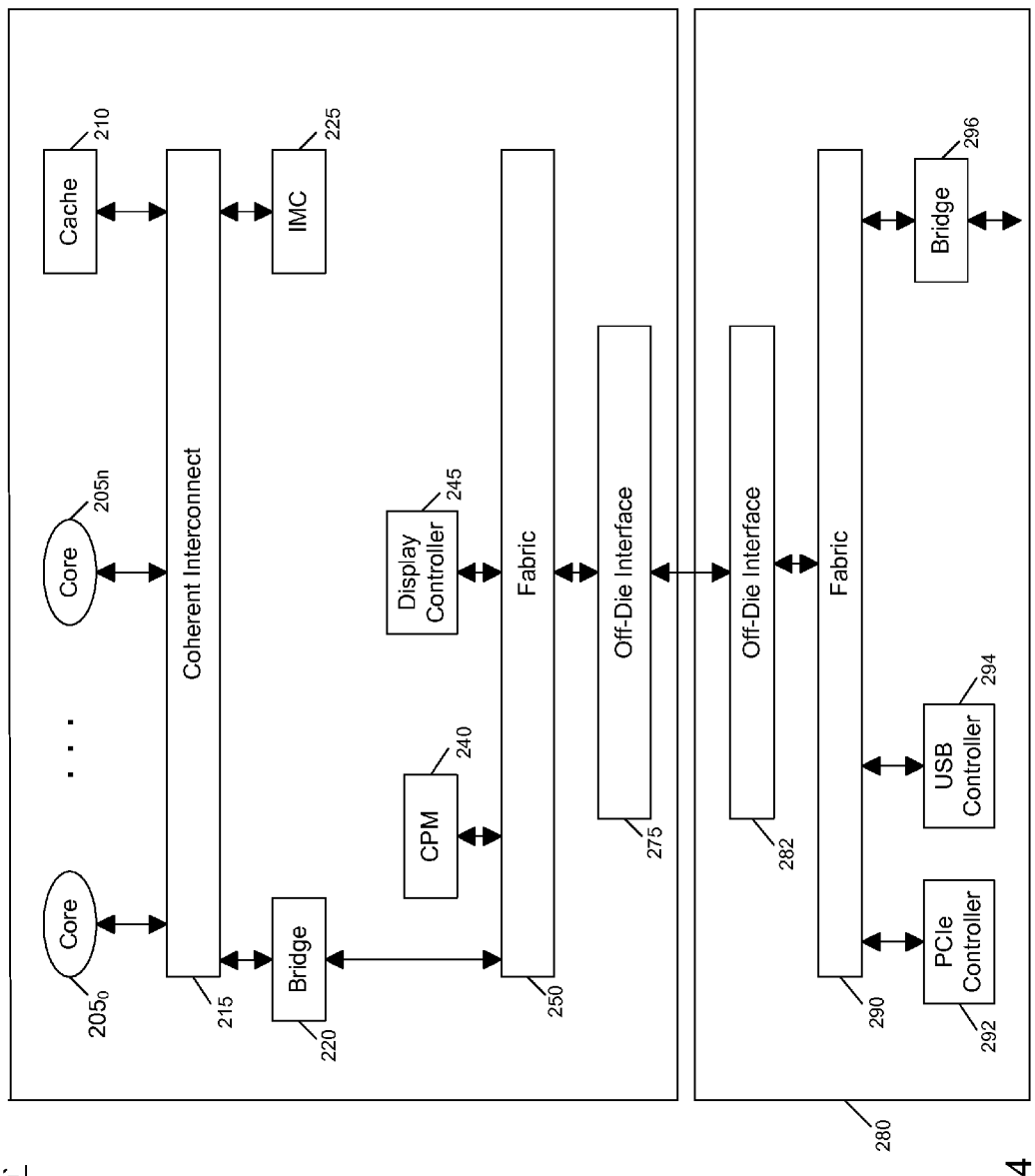
FIG. 4 is a block diagram of a system in accordance with another embodiment of the present invention.

Furthermore, understand that while shown as a single die SoC implementation in FIG. 3, embodiments can further be implemented in a system in which multiple chips communicate with each other via a non-IOSF interface. Referring now to FIG. 4, shown is a block diagram of a system in accordance with another embodiment of the present invention. As shown in FIG. 4, the system may include a SoC 200', which may include many components similar to those discussed above with regard to FIG. 3, and an additional off-die interface 275. Accordingly, SoC 200' can communicate with another chip 280 which may include various functionality to enable communication between these two chips, as well as to various off-chip devices such as different peripherals according to one or more different specifications. Specifically, a second chip 280 is shown to include an off-die interface 282 to enable communication with SoC 200', and which in turn communicates with a fabric 290, which may be an IOSF fabric according to an embodiment of the present invention. As seen, fabric 290 may further be coupled to various controllers in communication with off-chip devices, including a PCIe™ controller 292, a USB controller 294, and a bridge 296.

In various embodiments, a PCI-compliant agent may be configured to perform error handling operations for when the agent receives a transaction it cannot handle. More specifically, embodiments provide for the agent to respond to such transactions with an unsupported request indication. Thus in various embodiments a PCI-compliant agent can be configured to handle certain transactions as URs. As one such example, when an agent receives a command put with a known and supported format, type, and traffic class, the transaction can still be treated as an unsupported request due to the present configuration state of the agent. This may occur, for example, where according to a configuration set forth in the configuration space of the PCI-compliant device it cannot handle the particular transaction. This may occur when the configuration space indicates that a memory space enable bit is clear. Other examples include when the agent is in a non-active state. These situations arise due to the pipelined nature of IOSF address decode logic. Between the time the transaction is decoded as valid and when the transaction is put to the agent, an intervening transaction put may change the configuration state. The change in state results in the error condition.

Posted or non-posted transactions received by the agent that are to be handled as URs can be discarded and appropriate transaction command and data credits can be returned to the fabric to update its corresponding credit counters. If the transaction was non-posted, then an unsuccessful completion with a UR completion status will be returned.

To perform error logging and signaling in a PCI-compliant agent, one or more configuration registers can be included in agent-specific configuration space for the handling of unsupported requests. These registers do not exist in the standard PCI header space because the standard PCI registers were not designed to support handling unsupported requests. In one embodiment, a first configuration register may be used to identify detection of an unsupported request. Accordingly, this register may be referred to as an unsupported request detection (URD) register. In this embodiment, the register can be set to a logic high by hardware upon detection of an unsupported request that is not considered an advisory non-fatal error. The register can be cleared to a logic low when software writes a logic high to this register.

In turn, a second configuration register can be used to indicate whether reporting of an unsupported request is enabled. Accordingly, this register can be referred to as an unsupported request reporting enable (URRE) register. In this embodiment, the register can be set to logic high, e.g., by software. When set, the register allows reporting of an unsupported request as a system error.

If a received transaction is a non-posted request and is unsupported, e.g., due to configuration of the agent, then the agent can handle the transaction as an advisory non-fatal error, and no error logging or signaling is done. Instead, because of the nature of the IOSF specification such that a completion is sent for an incoming non-posted request, embodiments can indicate the unsupported request via a completion that includes a UR completion status, which serves the purpose of error reporting.

If the received transaction is a posted request and is not a Type 1 vendor-defined message (which is to be silently discarded by the receiving agent if it does not support the VDM), then the agent sets the unsupported request detection register in agent-specific configuration space. If both the URRE and a system error (SERR#) enable register are set to a logic high, then the agent sets the signaled system error indicator in a status register and sends a DO_SERR message on a sideband interface, which can lead to a fatal system error such as the familiar "blue screen of death".

Figure 5:
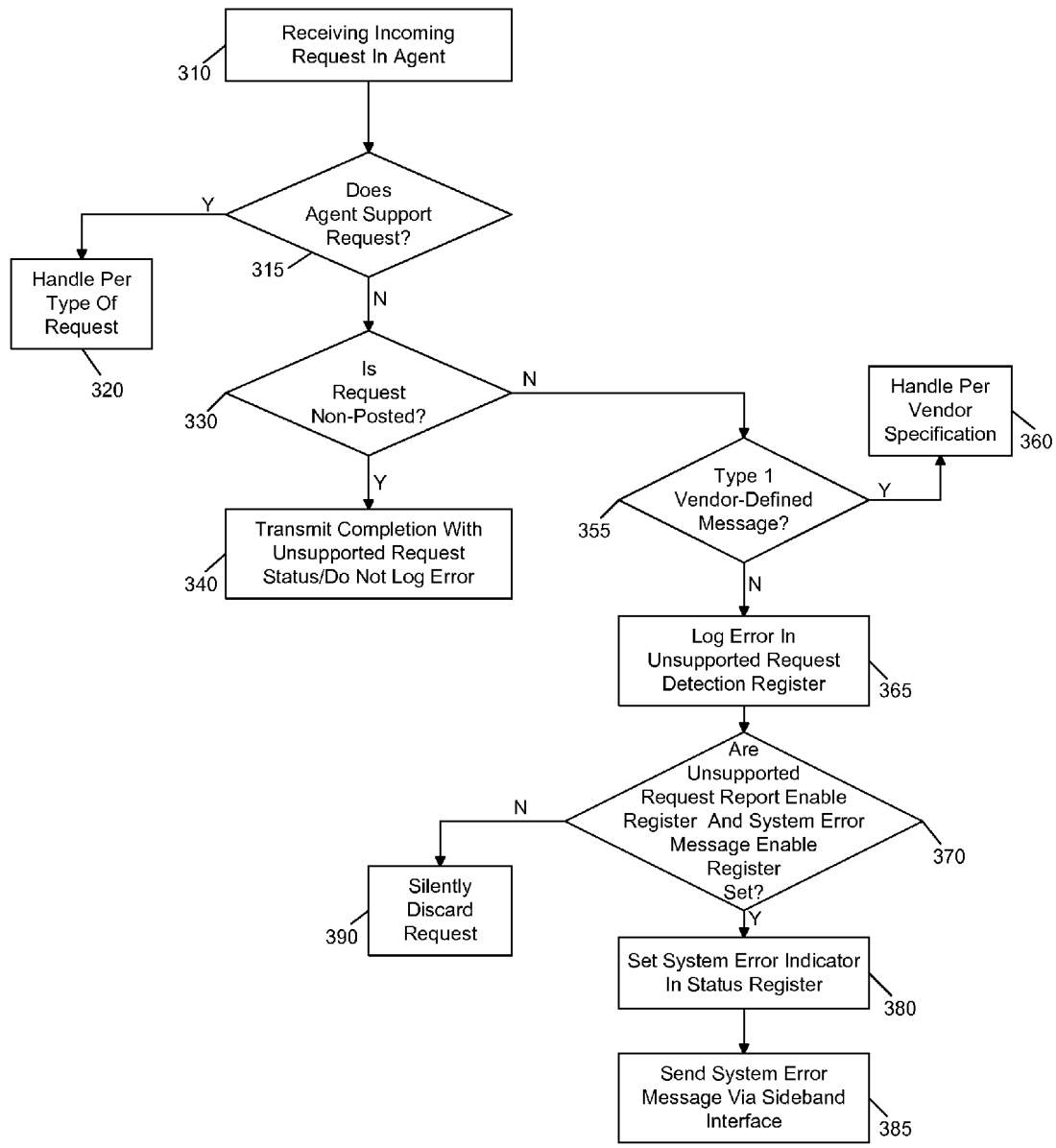
FIG. 5 is a flow diagram of a method in accordance with an embodiment of the present invention.

Referring now to FIG. 5, shown is a flow diagram of a method in accordance with an embodiment of the present invention. As shown in FIG. 5, method 300 may be implemented by a PCI device incorporated in, e.g., a SoC in accordance with the IOSF specification. As seen in FIG. 5, method 300 may begin by receiving an incoming request in the agent (block 310). Next it may be determined at diamond 315 whether the agent supports the request. Although the scope of the present invention is not limited in this regard, in one embodiment the determination of whether the agent supports the request can be based on a request type and address field associated with the request and information present, e.g., in the configuration state of the agent. More specifically, the configuration state may include or be coupled to a table that lists the supportable request types for the agent, e.g., for Type 0 VDM messages. If the incoming request type does not match an entry in this list, it can be assumed that the device does not support the request. If it is determined that the device supports the request, e.g., by its presence in this list, control passes to block 320 where the request can be handled per the rules in the logic for handling the given request type.

If instead it is determined that the agent does not support the request control passes to diamond 330, where it can be determined whether the incoming request is a non-posted request. Again, this determination can be based on information in the received request. If the request is a non-posted request, control passes to block 340 where a completion can be transmitted from the agent for the request. More specifically, the completion may indicate that the request is not supported by the device. However, no error logging occurs in this event, as the completion itself provides the indication to the requester of the non-support.

Referring still to FIG. 5, if instead at diamond 330 it is determined that the request is not a non-posted request (e.g., it is a posted request or another type of request), control passes to diamond 355. There it can be determined whether the incoming request is a Type 1 vendor defined message. If so, control passes to block 360 where the request can be handled per vendor specification. For example, the request can be silently discarded per a given PCIe™ specification.

Instead if the incoming request is not a Type 1 vendor defined message, control instead passes to block 365 where an error can be logged in an unsupported request detection register of the agent. Next, control passes to diamond 370 where it can be determined whether both an unsupported request report enable register and a system error message enable register are set. If so, control passes to block 380 where a system error indicator can be set in a status register, e.g., a PCI status register. Accordingly, control passes to block 385 where a system error message can be sent via a sideband interface. Accordingly, the message may be received in a router, which can route the error message to an appropriate destination, e.g., to a root complex event collector or other error handling agent. As further seen in FIG. 5, if both the unsupported request report enable register and the system error message enable registers are not set, control instead passes to block 390 where the message is silently discarded. Although shown with this particular implementation in the embodiment of FIG. 5, understand the scope of the present invention is not limited in this regard.

Figure 6:
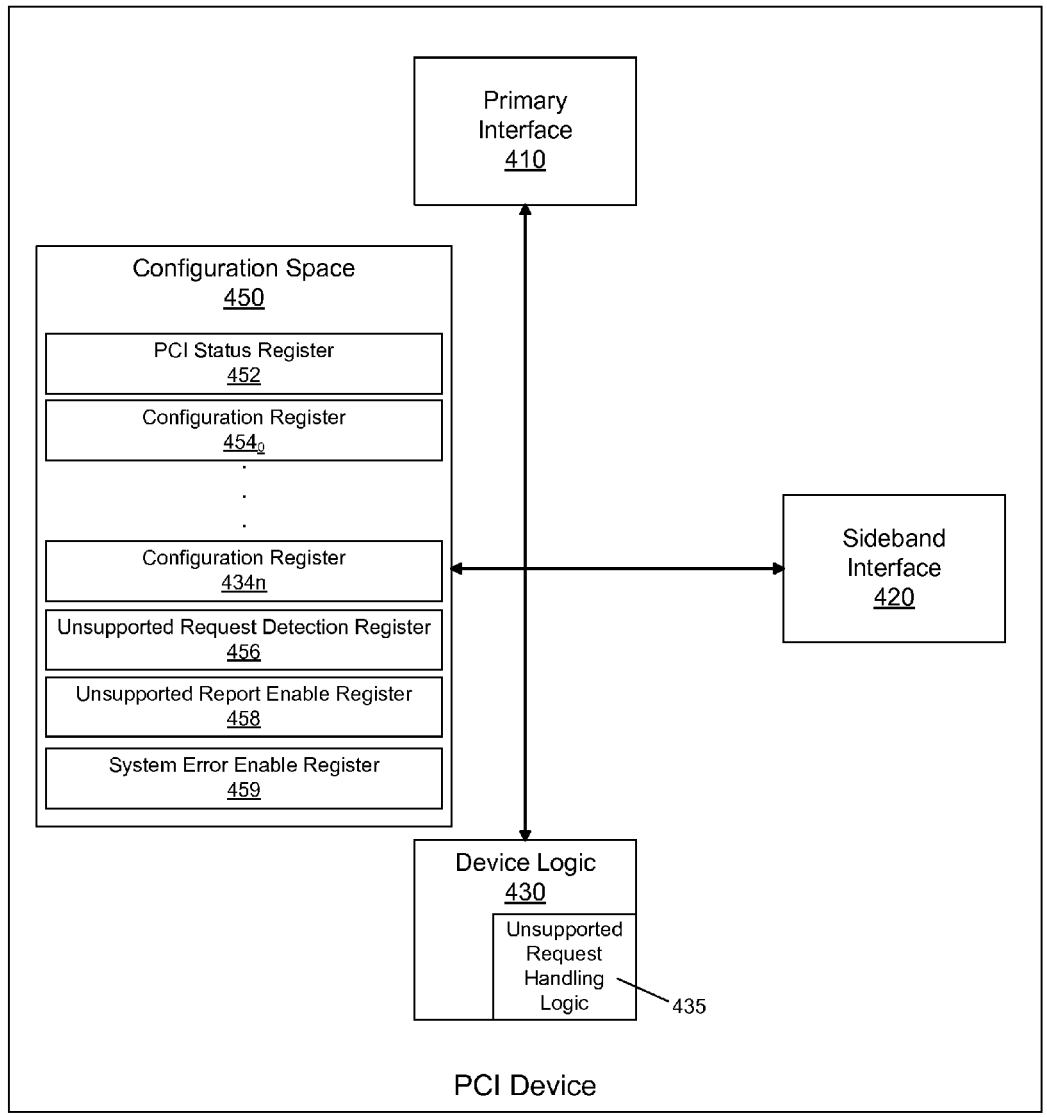
FIG. 6 is a block diagram of a representative PCI device in accordance with one embodiment of the present invention.

Referring now to FIG. 6, shown is a block diagram of a representative PCI device, which can be incorporated into a SoC as an IP agent 400. As seen at the high level of FIG. 6, agent 400 may include a primary interface 410, which may communicate with a fabric (not shown for ease of illustration in FIG. 6). Although not shown understand that primary interface 410 may include a master interface portion and a target interface portion, as discussed above. In addition to this primary interface, a sideband interface 420 may be present, and which also may include a master interface and a target interface.

As further seen in FIG. 6, these interfaces may be coupled to a device logic 430, which may be the primary logic of the PCI device. For example, a PCI controller device may include controller logic, e.g., to control and perform various processing such as control of a hard disk drive. As further seen, device logic 430 may include an unsupported request handling logic 435 in accordance with an embodiment of the present invention. In general, logic 435 may perform method 300 shown in FIG. 5 to thus handle unsupported requests in the PCI device which according to its native design does not include such support.

Furthermore to enable handling unsupported requests in accordance with an embodiment of the present invention, a configuration space 450 may include various registers. As seen in the embodiment of FIG. 6, configuration space 450 may include a PCI status register 452. Status register 452 may include various fields and/or bits to provide different status indications in accordance with the PCI specification. As one example, status register 452 may include a system error indicator, which as discussed above can be set in certain circumstances responsive to an unsupported request detection. In addition to this register, configuration space 450 may further include configuration registers $454_0$-$454_n$, which can be used to store configuration information for the PCI device, e.g., as received during configuration cycles. In addition, to enable unsupported request handling in accordance with an embodiment of the present invention, configuration space 450 may further include an unsupported request detection register 456, an unsupported report enable register 458 and a system error enable register 459. In one embodiment, unsupported request detection register 456 may be of a first state (e.g., logic high) to indicate that an incoming request is not supported by the device. In one embodiment, unsupported report enable register 458 may be of a first state to enable reporting of an unsupported request as a system error. And system error enable register 459 may be of a first state to enable sending of the system error message. Although shown with this high level view in the embodiment of FIG. 6, understand the scope of the present invention is not limited in this regard.

Figure 7:
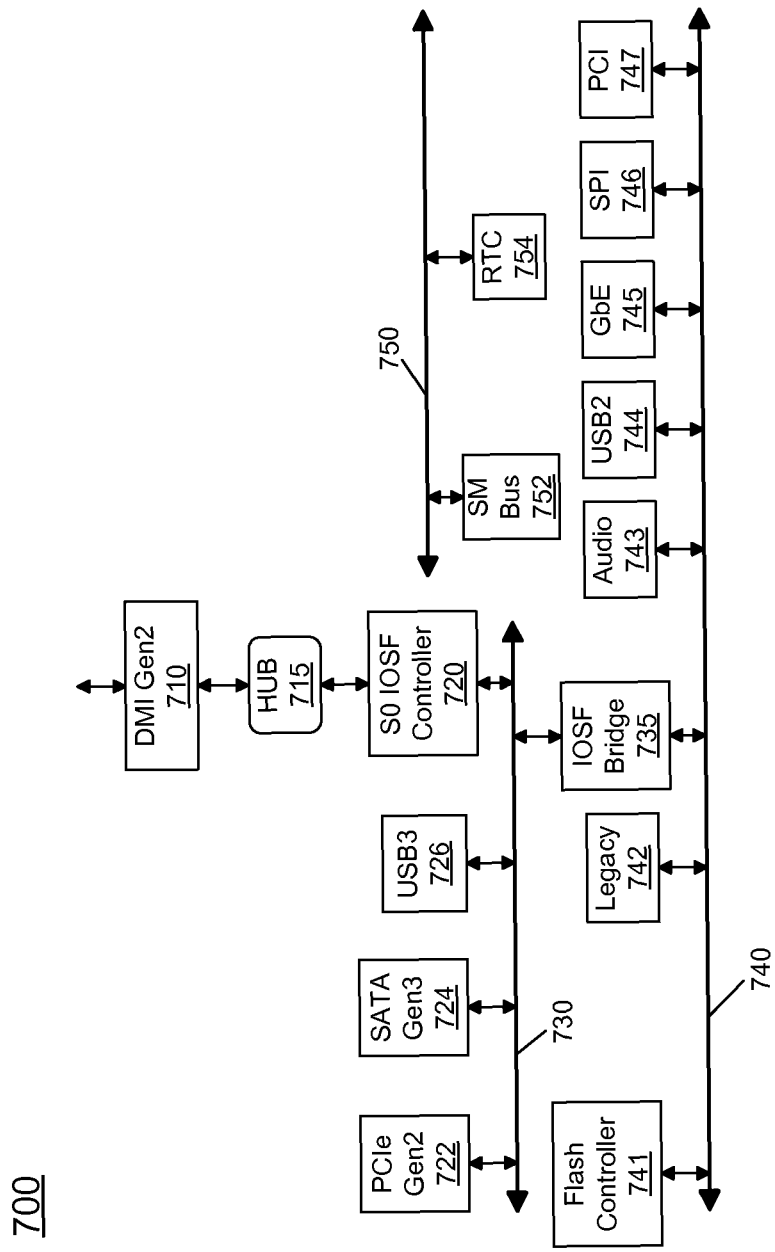
FIG. 7 is a more detailed block diagram of a portion of a SoC in accordance with an embodiment of the present invention.

Although the SoCs of FIGS. 3 and 4 are at a high level, understand that additional functionality may be present. Referring now to FIG. 7, shown is a more detailed block diagram of a portion of a SoC in accordance with an embodiment of the present invention. As shown in FIG. 7, the portion of SoC 700 shown may correspond to non-core portions coupled below a memory controller hub or other interface logic that can in turn interface to multiple processor cores, as well as to system memory.

Thus as seen, an off-die interface 710 (which in one embodiment can be a direct media interface (DMI)) may couple to a hub 715, e.g., an input/output hub that in turn provides communication between various peripheral devices. Although not shown for ease of illustration in FIG. 7, understand that various engines such as a manageability engine and a virtualization engine can also be directly coupled to hub 715.

To provide connection to multiple buses, which may be multi-point or shared buses in accordance with the IOSF specification, an IOSF controller 720 may couple between hub 715 and bus 730, which may be an IOSF bus that thus incorporates elements of the fabric as well as routers. In the embodiment shown in FIG. 7, first IOSF bus 730 may have coupled to it various controllers to provide for control of off-chip devices. Specifically, seen is a PCI controller 722, a SATA controller 724, and a USB controller 726. In turn, a second IOSF bus 750 may couple to a system management bus 752 and to a real time clock 754.

As further seen in FIG. 7, first IOSF bus 730 may couple to an IOSF bridge 735 for both primary and sideband information that in turn provides interconnection to a third bus 740, e.g., of a different protocol, to which various controllers and components may be attached. In the embodiment shown in FIG. 7, such components include a flash controller 741 to provide an interface to a non-volatile memory, a legacy device 742, which may implement various legacy functions, e.g., of a PCI specification and further may include an interrupt controller and timer. In addition, interfaces for audio 743, USB 744, gigabyte Ethernet (GbE) 745, serial peripheral interface (SPI) 746 and PCI 747 may all be provided. Although shown with this particular implementation in the embodiment of FIG. 7, understand the scope of the present invention is not limited in this regard.

Figure 8:
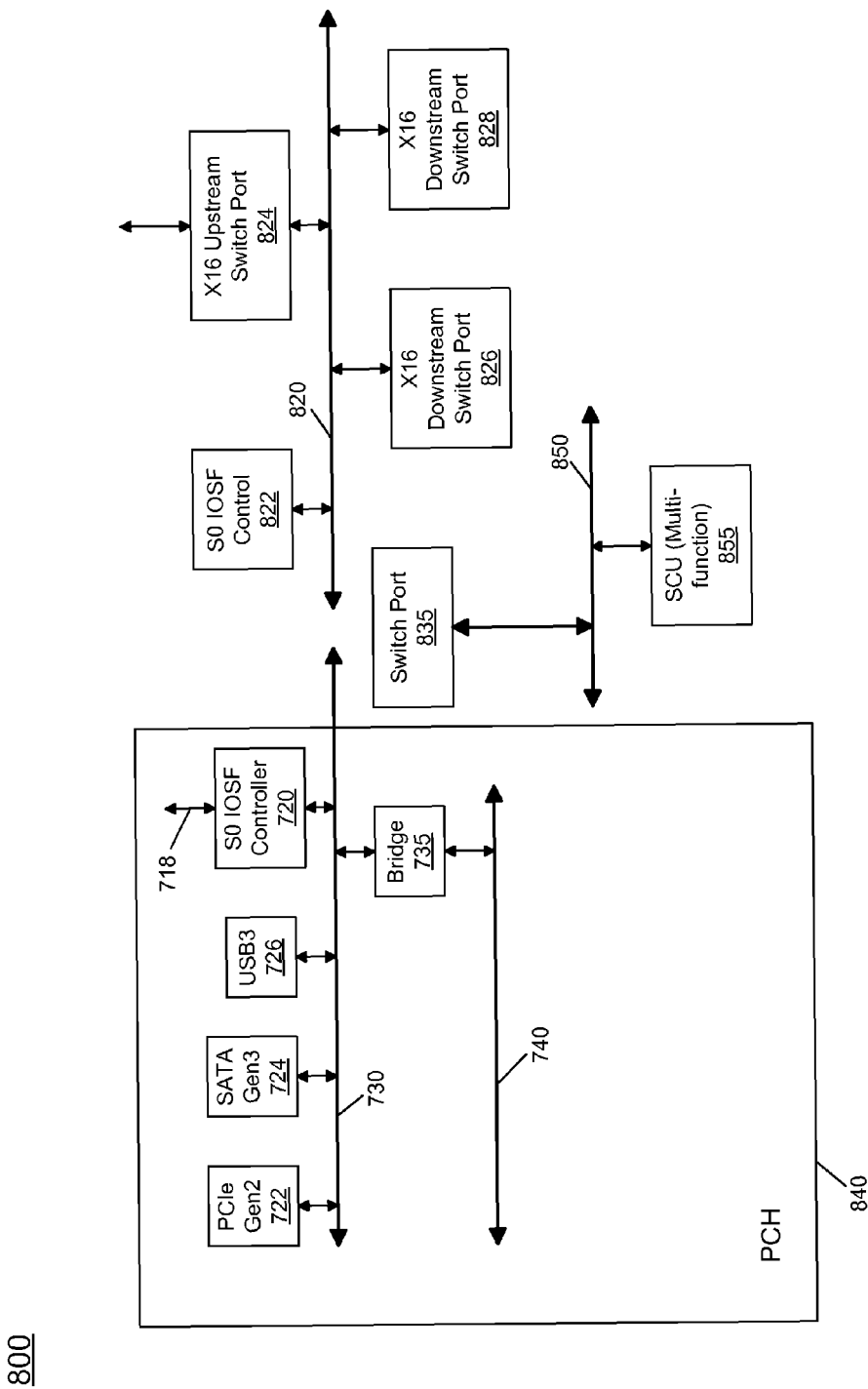
FIG. 8 is a block diagram of another SoC in accordance with an embodiment the present invention.

Still other implementations are possible. Referring now to FIG. 8, shown is a block diagram of another SoC in accordance with an embodiment the present invention. As shown in FIG. 8, SoC 800 may be configured for use, e.g., in server systems. As seen in FIG. 8, SoC may include a platform controller hub (PCH) 840, which may generally include components such as seen in the embodiment of FIG. 7. Namely, multiple IOSF buses 730 and 740 may be present, along with a bridge 735 to couple the buses. Bus 730 may include various agents coupled to it, including a PCIe controller 722, SATA controller 724, and a USB controller 726. In turn, via an IOSF controller 720, communication may occur via an additional bus 718, which may communicate with upstream devices, such as cores or other processing units (not shown for ease of illustration in the embodiment of FIG. 8).

As further seen in FIG. 8, for providing communications with other server-based components, an additional IOSF bus 820 may be provided, which in turn can communicate with an IOSF controller 822 and an upstream switch port 824 (e.g., an X16 port) that may be coupled to an upstream bus 825. Also coupled to bus 820 may be multiple downstream switch ports 826 and 828.

Furthermore, to enable communications, e.g., with storage units of a server-based system, a switch port 830 may couple between bus 820 and another IOSF bus 850, which in turn may be coupled to a storage controller unit (SCU) 855, which may be a multi-function device for coupling with various storage devices.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a semiconductor die including but not limited to:
     a plurality of agents;
     a fabric coupled to the plurality of agents via a fabric primary interface, the fabric primary interface including at least one master interface to initiate transactions and at least one target interface to receive transactions;
     a router having a sideband message interface to couple to a first agent of the plurality of agents via a sideband interconnect;
     wherein the first agent of the plurality of agents includes a primary interface to couple to the fabric primary interface, a first sideband message interface to couple to the router via the sideband interconnect, and a testability and debug interface to couple to a third fabric, the first agent further including:
       an unsupported request detection register to indicate that the first agent does not support an incoming request;
       an unsupported request report enable register to enable report as a system error of an incoming request that the first agent does not support; and
       a system error enable register to enable a system error signal to be sent.

2. The apparatus of claim 1, wherein the first agent is to set the unsupported request detection register to a first state responsive to detection of the incoming request that the first agent does not support.

3. The apparatus of claim 2, wherein the first agent is to report the incoming request that the first agent does not support as a system error as a system error message via the first sideband message interface when the unsupported request report enable register is set to the first state.

4. The apparatus of claim 1, wherein the first agent is to send a completion for a non-posted request that the first agent does not support.

5. The apparatus of claim 4, wherein the first agent is to include an unsupported request completion status in the completion.

6. The apparatus of claim 1, wherein the first agent is to set the unsupported request detection register responsive to receipt of a posted request that the first agent does not support.

7. The apparatus of claim 1, wherein the first agent further comprises a status register, and wherein the first agent is to set a signaled system error indicator in the status register when the unsupported request detection register is set and the system error enable register is to enable the system error signal to be sent.

8. The apparatus of claim 7, wherein the first agent is to send a system error message on the sideband interconnect when the signaled system error indicator is set in the status register.

9. The apparatus of claim 1, wherein the first agent comprises a Peripheral Component Interconnect (PCI) device to support a PCI specification and not support a Peripheral Component Interconnect Express (PCIe) specification.

10. A non-transitory computer readable storage medium including information that, when manufactured into a system on a chip (SoC), is to configure the SoC to:
    receive a request in an agent of the SoC, the agent including at least one primary interface and at least one sideband message interface, the agent to be coupled to a fabric of the SoC, wherein when the agent does not support the request, the agent is to:
      update an unsupported request detection register of the agent;
      determine whether an unsupported request reporting enable register of the agent is enabled and if so, set a system error indicator in a status register of the agent, wherein the agent is to support a Peripheral Component Interconnect (PCI) specification and not support a Peripheral Component Interconnect Express (PCIe) specification; and determine whether a system error enable register is enabled and if so, send a system error message via the at least one sideband message interface.

11. The non-transitory computer readable medium of claim 10, wherein the information, when manufactured into the SoC, is to configure the agent to handle a non-posted request that the agent does not support as an advisory non-fatal error.

12. The non-transitory computer readable medium of claim 11, wherein the information, when manufactured into the SoC, is to configure the agent to send a completion to report that the agent does not support the non-posted request.

13. The non-transitory computer readable medium of claim 10, wherein the information, when manufactured into the SoC, is to configure the agent to set the unsupported request detection register to a first state responsive to detection of the request that the agent does not support.

14. The non-transitory computer readable medium of claim 10, wherein the information, when manufactured into the SoC, is to configure the agent to send a completion for a non-posted request that the agent does not support.

15. The non-transitory computer readable medium of claim 14, wherein the information, when manufactured into the SoC, is to configure the first agent to include an unsupported request completion status in the completion.

16. A system-on-chip (SoC) comprising:
at least one core to execute instructions;
a coherent interconnect coupled to the at least one core;
a memory controller coupled to the coherent interconnect;
at least one agent including:
an unsupported request detection register to indicate that the at least one agent does not support an incoming request;
an unsupported request report enable register to enable report as a system error of an incoming request that the at least one agent does not support; and
a system error enable register to enable a system error signal to be sent;
a fabric coupled to the coherent interconnect and to the at least one agent; and
a router coupled to the at least one agent via a sideband interconnect, wherein the at least one agent comprises a Peripheral Component Interconnect (PCI) device.

17. The SoC of claim 16, further comprising a bridge coupled to the fabric to communicate with at least one component.

18. The SoC of claim 17, wherein the at least one component is of an open core protocol (OCP) or an ARM advanced microcontroller bus architecture (AMBA) protocol.

19. The SoC of claim 16, wherein the at least one core comprises a first in-order core and a first out-of-order core.

20. The SoC of claim 16, wherein the SoC is to be incorporated in a server computer, the SoC including a storage controller to couple with at least one storage device and at least one bus to couple to at least one of a serial ATA (SATA) controller or a Peripheral Component Interconnect Express (PCIe) controller.

21. The SoC of claim 16, wherein the SoC is to be incorporated in a mobile device having Internet capability, wherein the SoC further includes a first interface to interface with an audio device and a second interface to interface with a universal serial bus (USB) device.

22. The SoC of claim 16, wherein the SoC is to be incorporated in a server computer.

23. The SoC of claim 16, wherein the SoC is to be incorporated in a mobile device having Internet capability.

* * * * *